(No Model.) 10 Sheets—Sheet 1.
O. TVERDAL.
CASH REGISTER AND INDICATOR.
No. 514,292. Patented Feb. 6, 1894.
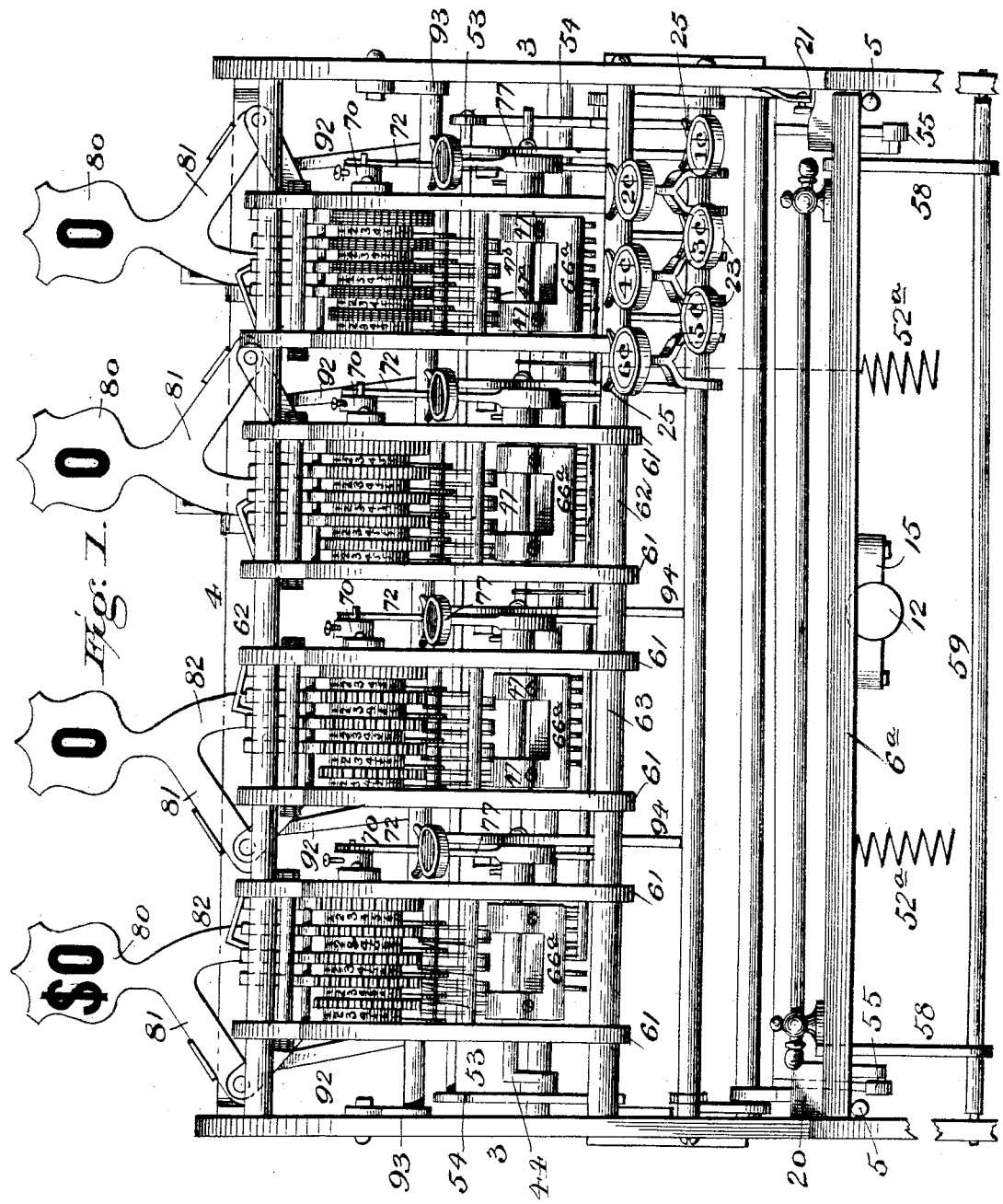

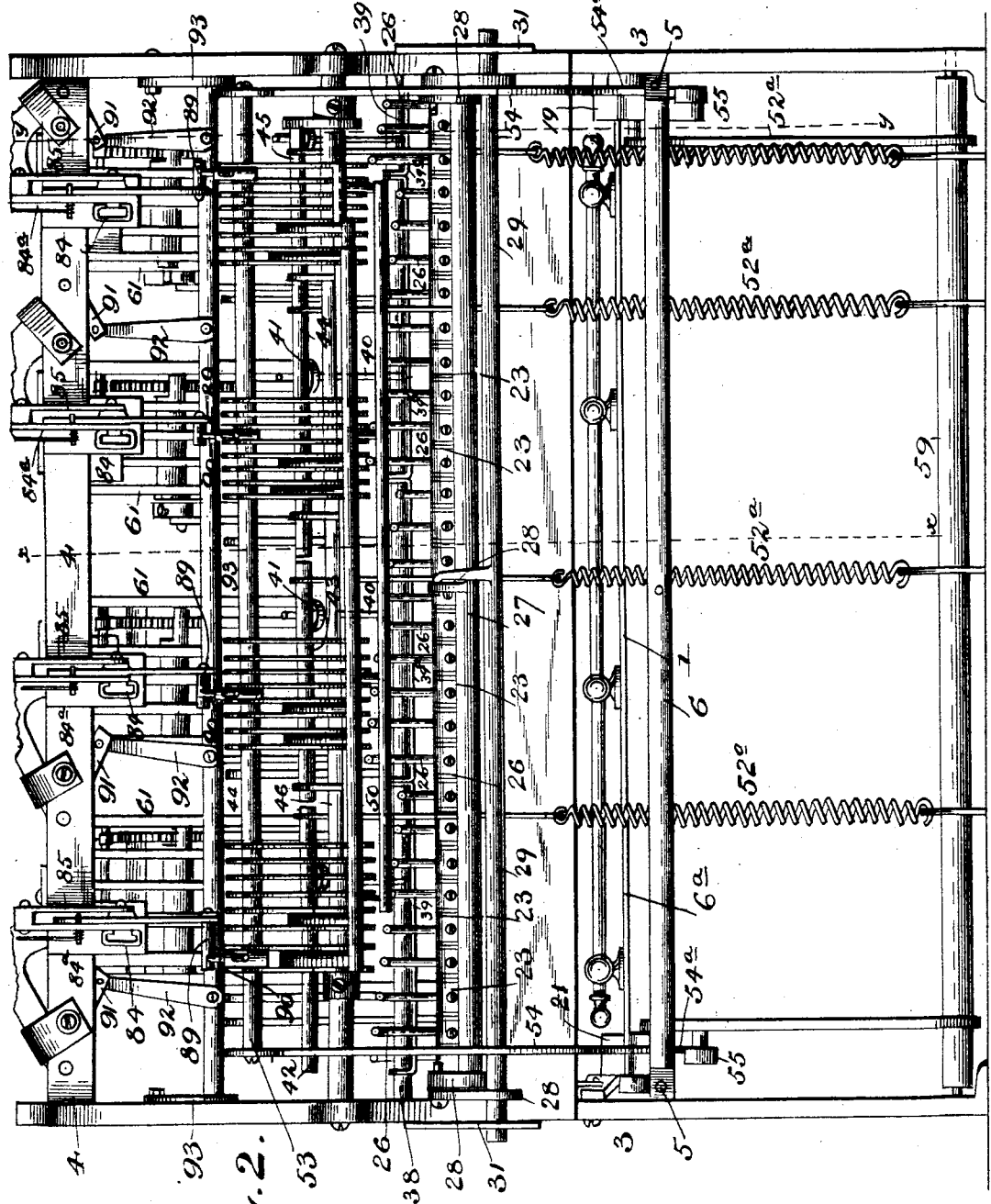

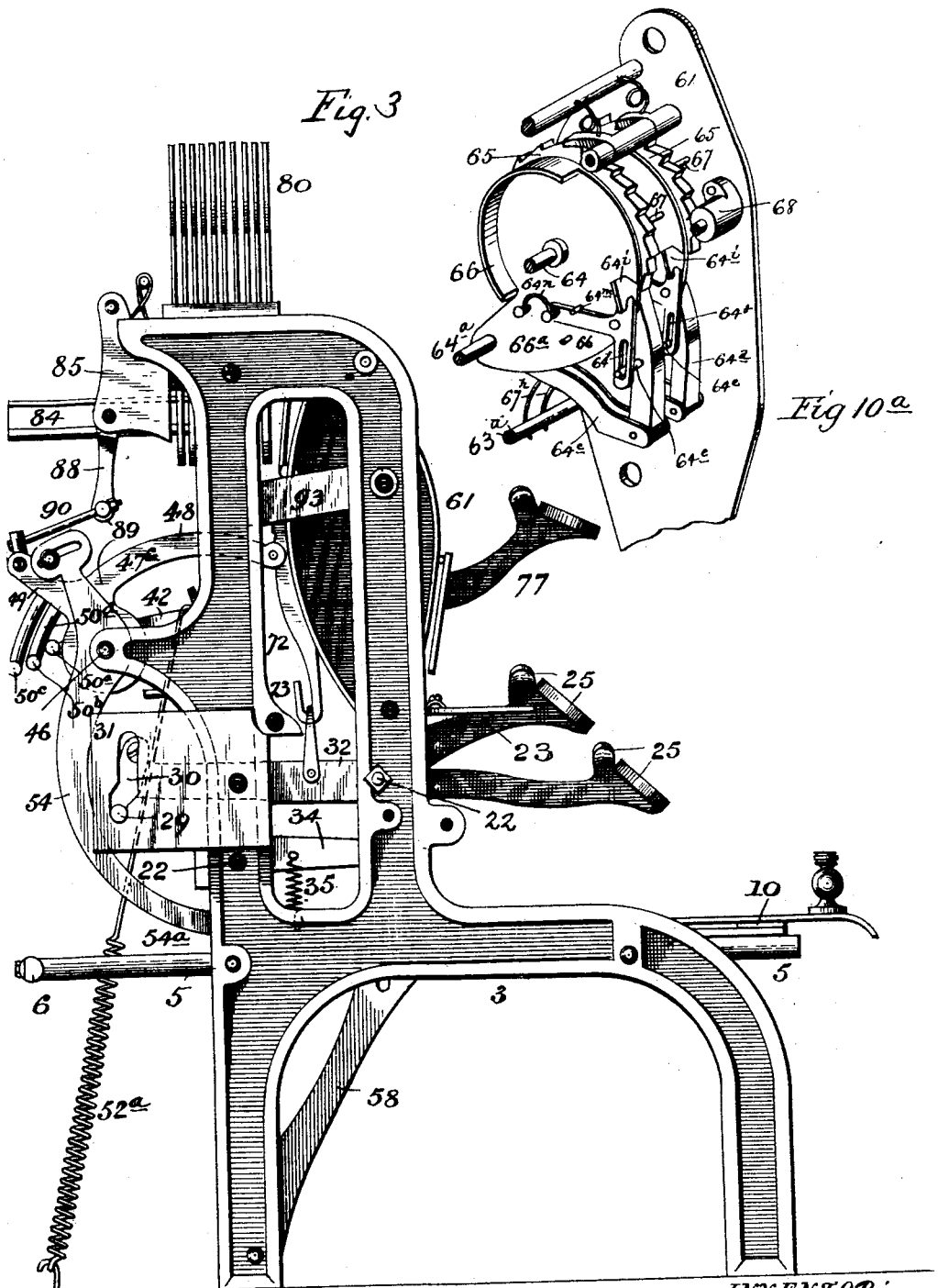

(No Model.) 10 Sheets—Sheet 4.
O. TVERDAL.
CASH REGISTER AND INDICATOR.
No. 514,292. Patented Feb. 6, 1894.
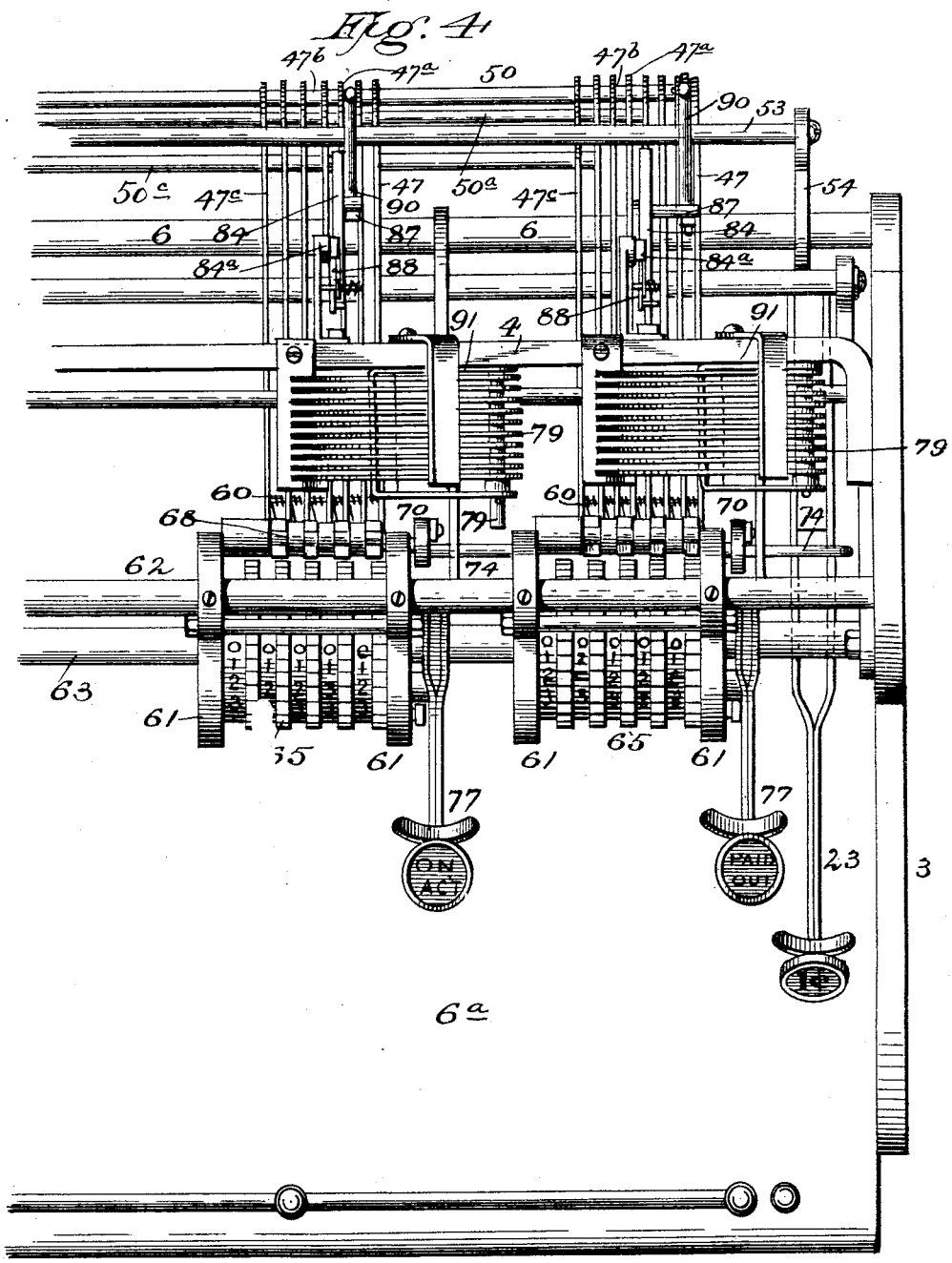

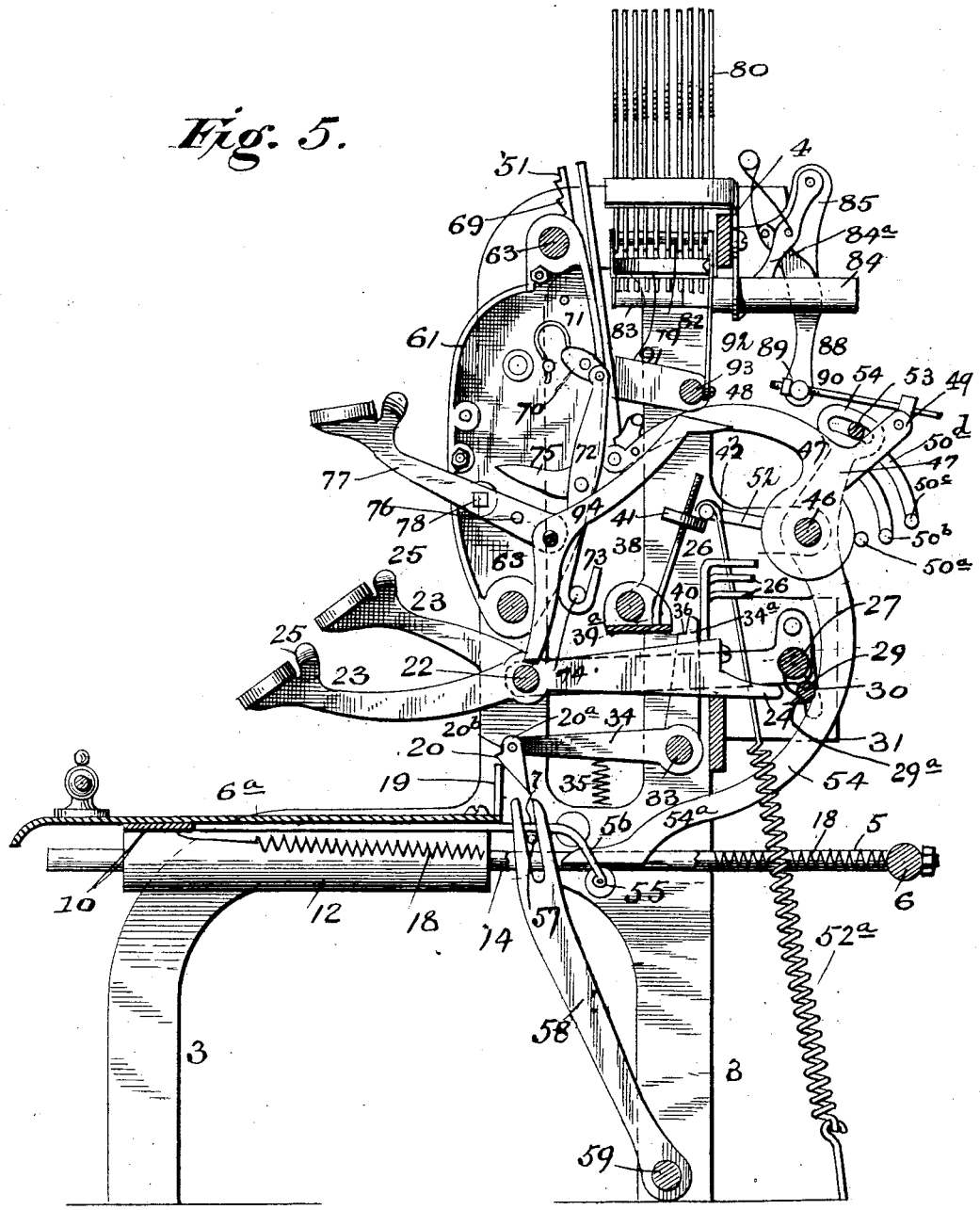

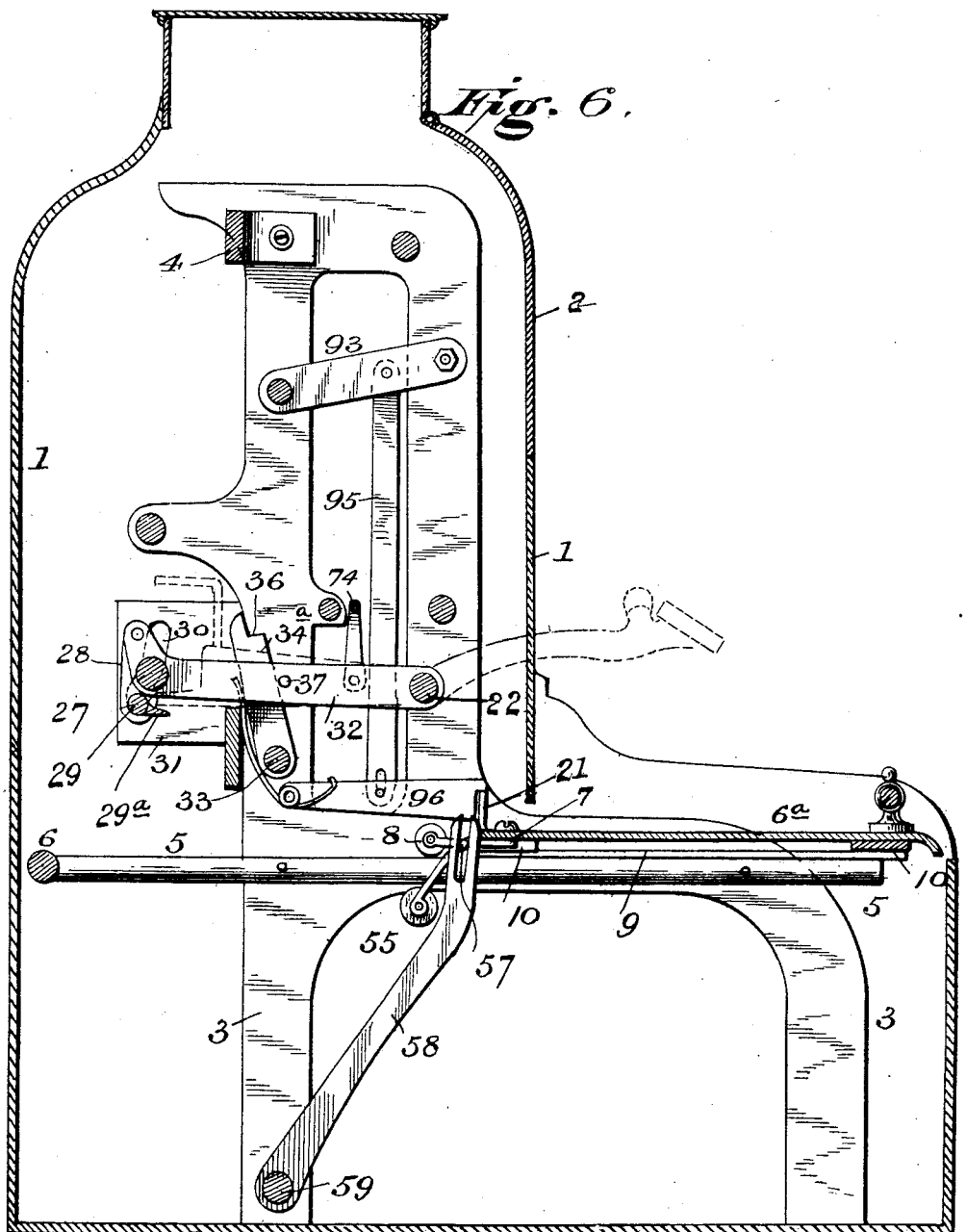

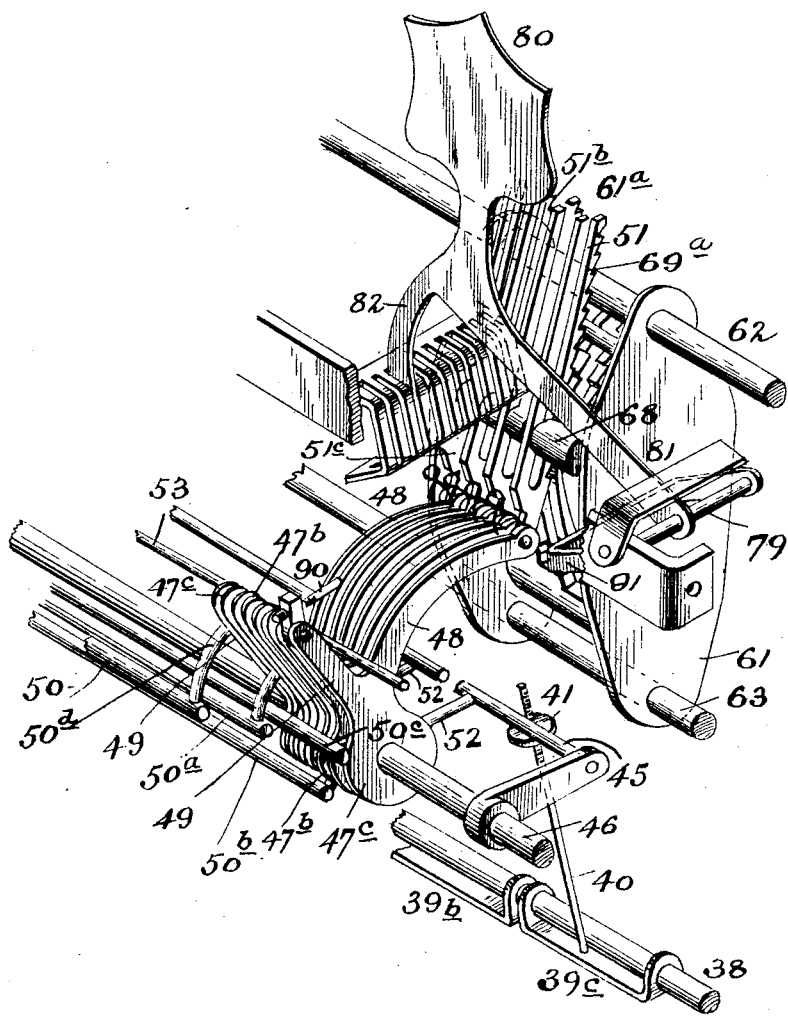

(No Model.) 10 Sheets—Sheet 8.
O. TVERDAL.
CASH REGISTER AND INDICATOR.
No. 514,292. Patented Feb. 6, 1894.
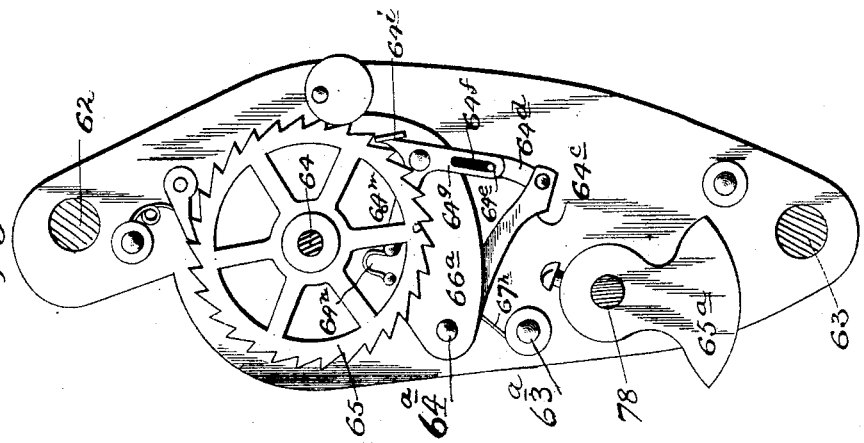
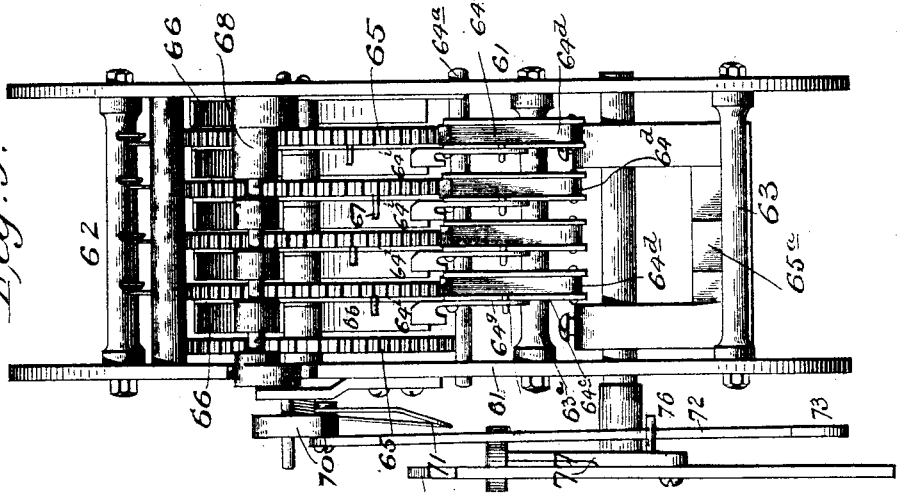
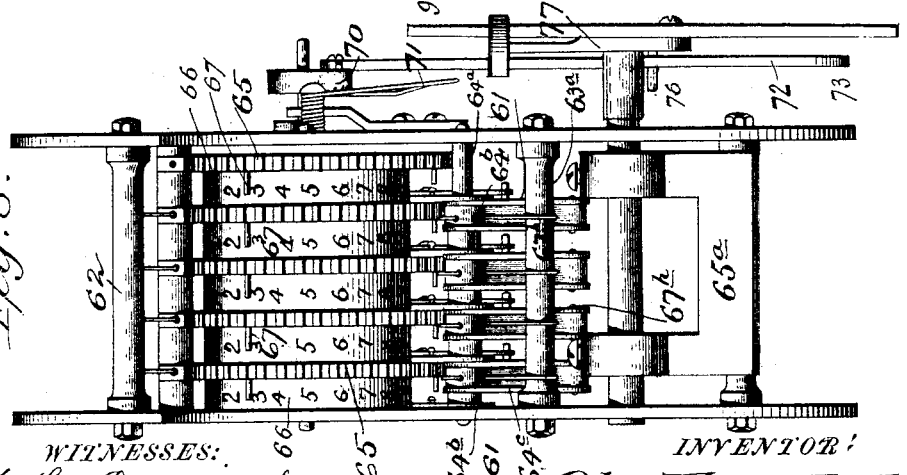
WITNESSES: INVENTOR:

(No Model.) 10 Sheets—Sheet 9.

O. TVERDAL.
CASH REGISTER AND INDICATOR.

No. 514,292. Patented Feb. 6, 1894.

WITNESSES:
F. L. Ourand
Jn. L. Coombs

INVENTOR:
Ole Tverdal
by Louis Bagger & Co.
Attorneys.

(No Model.) 10 Sheets—Sheet 10.

O. TVERDAL.
CASH REGISTER AND INDICATOR.

No. 514,292. Patented Feb. 6, 1894.

WITNESSES:
F. L. Ourand
H. L. Coombs

INVENTOR:
Ole Tverdal
by Laws Bagger & Co.
Attorneys

UNITED STATES PATENT OFFICE.

OLE TVERDAL, OF STOUGHTON, WISCONSIN, ASSIGNOR TO THE UNITED STATES CASH REGISTER COMPANY, OF SAME PLACE.

CASH REGISTER AND INDICATOR.

SPECIFICATION forming part of Letters Patent No. 514,292, dated February 6, 1894.

Application filed July 15, 1892. Serial No. 440,103. (No model.)

*To all whom it may concern:*

Be it known that I, OLE TVERDAL, a citizen of the United States, and a resident of Stoughton, in the county of Dane and State of Wisconsin, have invented certain new and useful Improvements in Cash-Registers; and I do hereby declare that the following is a full, clear, and exact description of the invention, which will enable others skilled in the art to which it appertains to make and use the same, reference being had to the accompanying drawings, which form a part of this specification.

My invention relates to improvements in cash registers of that class or description for which Letters Patent No. 486,306, dated November 15, 1892, were granted to me, assignor to the United States Cash Register Company. In said invention the amounts of individual sales are displayed and the aggregate sales registered by depressing indicating and registering keys, and by increasing the number of registering devices the amount of change taken from the till or cash receptacle in the course of business, the credit sales and credit accounts paid, may be registered by depressing the indicating keys which are depressed in registering cash sales.

The invention consists in the novel construction and combination of parts hereinafter fully described and claimed.

Figure 11:
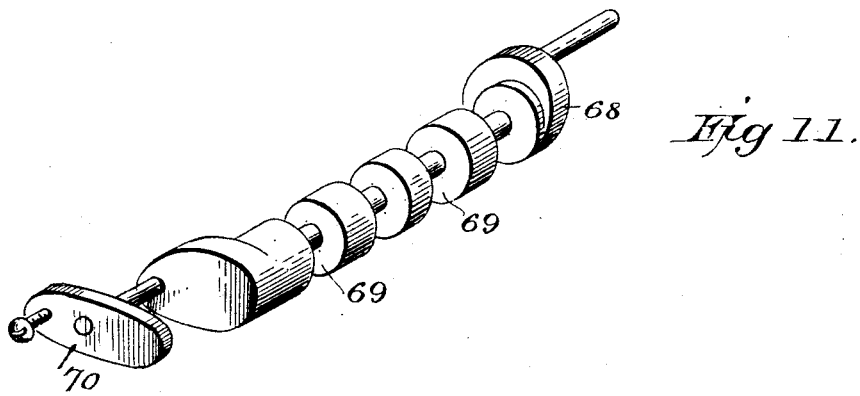
Figure 12:
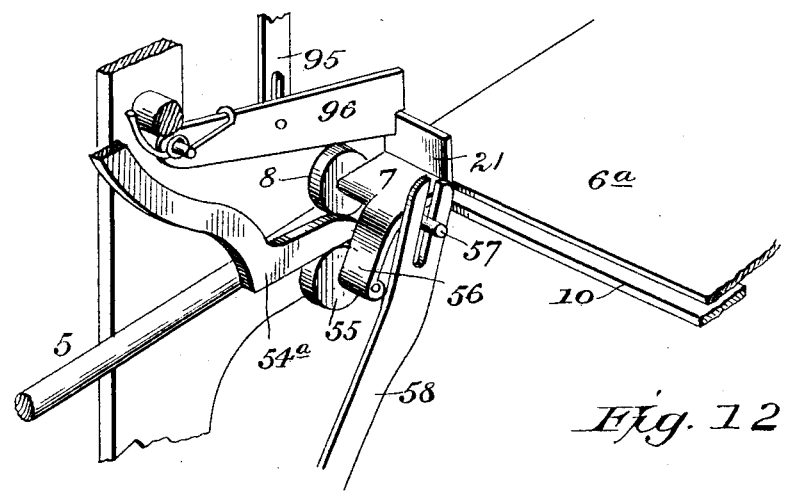
Figure 13:
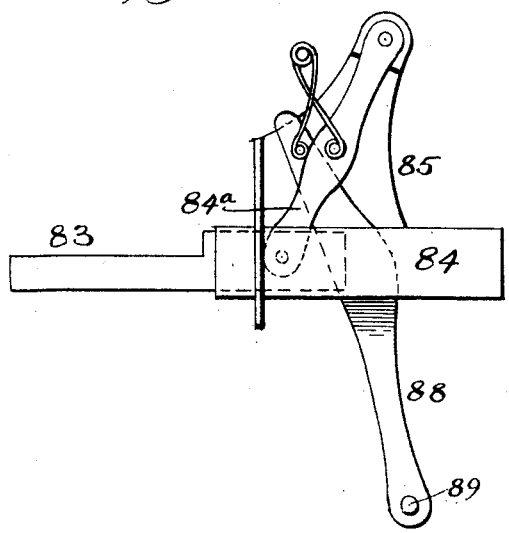
Figure 14:
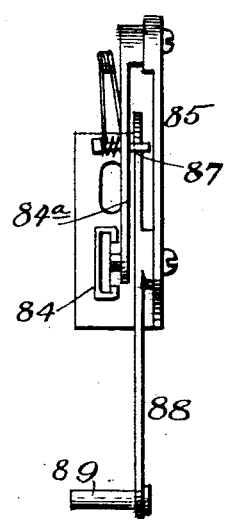
Figure 15:
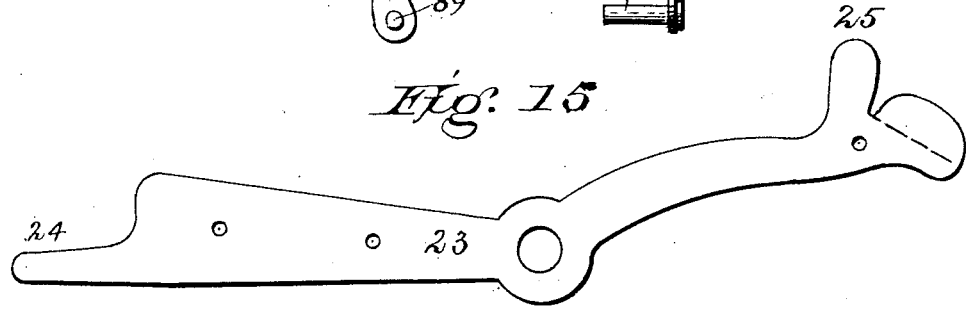
Figure 16:
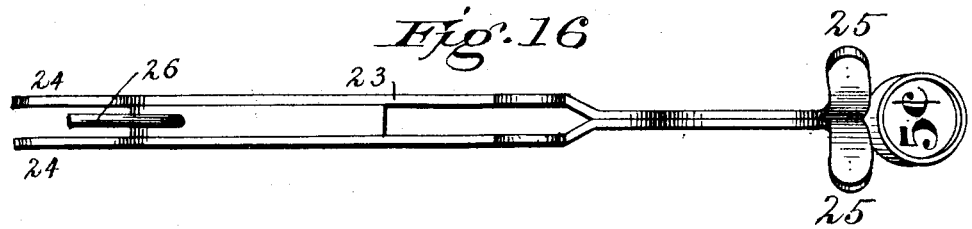

In the accompanying drawings: Figure 1 is a front view of a cash register constructed in accordance with my invention, part of the casing being removed or broken away. Fig. 2 is a rear view of the same. Fig. 3 is a side view. Fig. 4 is a plan view of one end of the apparatus. Fig. 5 is a longitudinal section on the line $x, x$, Fig. 2. Fig. 6 is a similar view on the line $y, y$, Fig. 2. Fig. 7 is a detail perspective view of one of the registering mechanisms and means for operating the disks thereof. Figs. 8 and 9 are front and rear views, respectively of one of the registering mechanisms. Fig. 10 is a sectional view of the same; and Fig. 10$^a$ is a detail perspective view. Fig. 11 is a detail perspective view of the eccentric rod for throwing the pitman out of engagement with the registering disks or wheels. Fig. 12 is a detail perspective view showing the means for locking the till cover. Figs. 13 and 14 are detail views of the means for operating the display plates. Fig. 15 is a view of one of the blanks for forming the keys. Fig. 16 is a view of one of the keys complete.

In the said drawings I have illustrated four registering mechanisms, which are separate and distinct from each other, one of which may be used for registering cash sales, another for credit sales, another for amounts taken from the till, and the other for registering amounts received from credit or time sales. I have also shown but three indicating keys in the tens of dollars series, see Fig. 2, as this it is believed will be found sufficient for all ordinary purposes, although more may be employed if desired.

The reference numeral 1 designates the casing of the apparatus, the front of which is provided with apertures for the passage of the indicating and registering keys, and also a sight opening through which the registering mechanism may be inspected and adjusted. This opening is closed by a hinged door or plate 2 see Fig. 6, which in practice is to be provided with a locking device, so that it cannot be opened by unauthorized persons.

The numeral 3 denotes the frame which supports the indicating and registering mechanisms and consists of side uprights adapted to be secured at their lower ends to a suitable base, and connected at their upper ends by means of a cross bar 4. Secured to the inner sides of these uprights are two horizontal rods 5, Figs. 1, 3, 6 and 12, connected together at their rear ends by a transverse rod 6. The rods 5 form supports for the sliding till cover 6$^a$, which at its rear or inner end at each side is provided with an arm 7 in which is journaled a friction roller 8 which works upon said rods. See Fig. 12. Upon its under side the till cover is provided with a rectangular frame consisting of end bars 9 and cross bars 10, connected together and secured to said cover. See Figs. 5, 6 and 12. Secured to the bars 10 at or near the center thereof is an air cylinder 12, in which works a piston provided with a piston-rod 14. This air cylinder is for the purpose of checking the movement of the till cover when opened.

The numeral 18 denotes a coiled spring connected with the rear end of the till cover and with the rod 6, see Fig. 5, so as to open the till cover when the same is unlocked as hereinafter described.

Secured to the rear of the till cover Figs. 5, 6 and 12, at one side is an upwardly projecting lug 19, which is adapted to engage with a pivoted lug 20. At its opposite end the till cover is also provided with a lug 21, by which the same is locked and unlocked as will be hereinafter set forth.

Pivoted to a transverse shaft 22, secured to the frame 3, are the indicating key levers 23, alternately arranged in two rows or banks, one above the other. These key levers each consist of two short metal plates, see Figs. 15 and 16, having extensions 24 at their rear ends and their front ends formed with outwardly projecting lugs 25. The front ends of these plates are brought together and riveted when the lugs 25 will form finger-plates to depress the keys. The keys are also provided with an annulus in front of the finger plates which are provided with indicating characters or numerals. The rear ends of the plates composing the key levers are provided with spacing plates to keep them the proper distance apart, and secured to these plates or key levers are upwardly projecting bent arms 26, see Figs. 2 and 5.

The characters on the key levers, beginning at one side of the machine are arranged in series of nines, as in my said application before referred to. These keys are preferably arranged with the keys indicating "cent" sales on the right of the machine, while the "dollar" keys are on the left, and the keys indicating decimals of a dollar intermediate thereof, although it is obvious that the order of arrangement may be reversed if desired or found convenient. In the present instance, the first nine keys, which indicate the units, are arranged in regular numerical order from "1" to "9," with the odd numbers in the lower row or bank, and the even numbers above. The next series of keys representing the decimals, follow in regular sequences of "ten" from "10" to "90," while the next series are arranged similarly to the "cents" series, and marked "$1." to "$9.," and so on. The bent arms 26 on the key levers are arranged at different heights thereon in regular order, forming as it were a series of steps so that for each series of nine keys, the said arms will gradually vary in height, as seen in Fig. 2.

The numeral 27 designates a transverse rod, the ends of which are connected with arms 32, journaled on shaft 22. The rear ends of these arms are connected by means of links 28, with a transverse rod 29, the ends of which work in angular slots, 30, in plates 31, secured to the frame 3 of the apparatus (see Figs. 2, 5 and 6). The rod 29 is provided with a forwardly-extending plate 29$^a$, (see Figs. 5 and 6) which extends from end to end thereof, and which engages with and locks the indicating-keys together when they are depressed.

Fastened to a transverse shaft 33, journaled in frame 3, is a two armed lever 34, the horizontal arm of which carries the pivoted stud 20 Figs. 3 and 5. This stud is recessed on its rear upper side forming two lugs 20$^a$ by which it is pivoted to said lever and is also formed with a shoulder 20$^b$, which engages with the end of said lever and which serves as a stop. By this means upon the rearward movement of the cover to open the till the lug 20 will give when the lug 19, abuts against or strikes the same so that no movement is imparted to the lever 34, but upon the return movement of the cover the movement of the lug 20, will be checked so that when lug 19 strikes the same, the lever will be actuated for a purpose hereinafter explained. Said horizontal arm of the lever is provided with a coiled spring 35, and at the opposite end of shaft 33, is an arm 34$^b$ similar to the vertical arm 34$^a$ of lever 34. The vertical arm 34$^a$ of lever 34, is provided with a notch 36, with which engages a stud 37, on one of the side arms 32, so that when the rod 27 is elevated by depressing a key lever, the stud will engage with said notch and hold the said rod elevated, until upon the return movement of the till cover after having been opened, the lug 19 strikes lug 20, and actuates lever 34, to release the stud from the notch. At the same time the plate 29$^a$ will engage under the end of the key lever and hold the same depressed.

Pivoted upon a transverse shaft 38, is a series of plates 39, 39$^a$, 39$^b$ and 39$^c$ one for each series of keys, which plates are located just above the rear ends of the key levers, and each plate is provided with an upwardly projecting rod 40, screw-threaded at its upper end to receive a screw-threaded nut 41, which is vertically adjustable thereon Figs. 2, 5 and 7. These nuts are adapted to engage with a series of bails 42, 43, 44, and 45, (one for each series of indicating keys) pivoted to a transverse rod or bar 46, which carries a number of levers 47, 47$^a$, 47$^b$, and 47$^c$ arranged in series of four each. Four series of these levers are shown in the present instance, one for each of the registering mechanisms. These levers each consist of two metal plates with long forwardly projecting arms 48, and short rearwardly projecting arms 49, and are connected together by screws or other fastening devices. Each of these levers of one series is connected with the corresponding levers of each of the other series, by means of bars 50, 50$^a$, 50$^b$, and 50$^c$ and arms 50$^d$. That is to say all the levers 47, are connected together by bars 50, the levers 47$^a$ by bars 50$^a$, levers 47$^b$ by bars 50$^b$ and levers 47$^c$ by bars 50$^c$. The curved arms of levers 47, 47$^a$, 47$^b$ and 47$^c$ are pivoted to the lower ends of rack-bars 51, 51$^a$ 51$^b$ and 51$^c$ which are vertically movable and engage with the registering wheels hereinafter described, see Fig. 7. The bails 42, 43, 44, and 45 are connected respectively with the levers 47, 47$^a$ 47$^b$ and 47$^c$ by means of short arms 52, and are provided with coiled springs 52$^a$ connected with the base. The short rear arms of said levers abut or bear against a transverse rod 53, secured to two-armed levers 54 one at each side of the apparatus and pivoted on the shaft or rod 46. The long curved arms 54$^a$ of these levers extend down underneath the till cover where their front ends engage with rollers 55 journaled in extensions 56 of the arms 7 secured to the till cover Figs. 2, 5 and 12. These extensions are also provided with inwardly extending pins or studs 57, which engage with the bifurcated ends of arms or lever 58, secured to a transverse rock shaft 59, journaled in the lower ends of the uprights of the supporting frame.

The rack-bars 51, 51$^a$ 51$^b$ 51$^c$ are pivoted to the curved arms of the levers 47 47$^a$ 47$^b$ 47$^c$, and as there are four sets of registering mechanisms shown in the present case, there are consequently sixteen levers and rack-bars, four for each registering mechanism. Each of these rack-bars corresponds with and is thrown into operative position respectively by the different series of registering keys connected with the registering mechanism, that is to say, the lever arm and its rack-bar on the right of each registering mechanism is adapted to be thrown into operative position to register the units on said registering mechanisms by depressing either of the unit keys numbered from "1" to "9" and depressing the registering key of the appropriate registering mechanism. The next adjoining keys indicate the dimes or decimals of a dollar to be registered, the next the dollars and so on. The arms and rack-bars are provided with springs 60, to throw the pitmen forward to engage with the registering wheels.

The numeral 61 see Figs. 7, 8, 9 and 10, designates the frame of the registering devices, consisting of upright side walls, suitably connected together and secured to transverse bars 62 and 63. In the upper part of these casings is secured a shaft 64 upon which is journaled a series of rotatable ratchet wheels 65, and intermediate of these wheels are fixed segment plates 66 having thereon a series of characters running from "0" to "9." The ratchet wheels have each thirty teeth and at intervals of each ten teeth are provided with laterally projecting pins 67. The rack-bars which engage with these teeth are slotted and embrace an eccentric rod 68 having annular peripheral grooves 69, by which the rack-bars are thrown in and out of engagement with the ratchet wheels. The outer sides of these rack-bars are provided with ratchets 69$^a$, which engage with the teeth of said wheels. The rods 68 are provided at one end with a crank 70 connected with a spring 71 secured to the upright, and pivoted to said cranks is a vertical lever 72, Fig. 5, the lower end of which is formed into a hook 73, which engages with a transverse bar 74 secured to the side pieces 32. Intermediate of their ends the levers 72 are provided with forwardly projecting arms 75 with which engage pins or studs 76 on the registering key levers 77, secured to transverse shafts 78 journaled in the frame of the registering mechanisms. When any of the ratchet wheels have been moved or rotated to the extent of ten teeth, I provide the following means for moving the next adjoining ratchet wheel of higher value the extent of one tooth, thus indicating on said latter wheel that the wheel of lesser value has been actuated ten times.

The numeral 64$^a$ see Figs. 9 and 10 denotes a cross-rod or bar secured to the frame of the registering device on which is loosely mounted a series of loose collars 64$^b$, (one for each of the ratchet wheels, except the "cents" wheel,) having rearwardly extending arms 64$^c$ to which are pivoted the upwardly extending pawls 64$^d$ provided with lateral pins 64$^e$. These pins engage with slots 64$^f$, in levers 64$^g$ pivoted to extensions 66$^a$ of segment plates 66. The upper ends of these levers are bent at an angle thereto forming short arms 64$^i$, which lie in the path of, and are adapted to be struck by the pointers 67, of the adjoining ratchet wheels of lesser value during the rotation of the latter, whereby the pawls 64$^d$ are thrown into engagement with the ratchets on the wheels to which they are pivoted. They are also provided with forwardly projecting arms 64$^m$ with which engage springs 64$^n$ secured to the segment plates 66. These springs aid in returning the pawl to normal position.

Springs 67$^h$ are secured to the collars 67$^b$ with their free ends resting upon the transverse bar 63$^a$, see Figs. 8, 9, 10 and 10$^a$ so as to return the pawl connected therewith to normal position. These pawls are actuated by a step cam-block 65$^a$, which is actuated by depressing the registering key as in my application before referred to.

For the purpose of displaying the amount registered by the registering devices, I provide the following means: Secured to the cross-bar 4 are four forwardly projecting shafts or rods, 79, on which are journaled the display plates, Figs. 3, 4, 5 and 7. These plates consist of the upper portion or head 80, arms 81, journaled on said rods 79, and curved downwardly projecting arms 82. These display plates are arranged in series of ten each, with the exception of those at the extreme left of the machine, and each series of plates has numerals or characters thereon, corresponding with the characters on the indicating keys, except the front plate of each series which is marked with a "0," that is to say the characters on the plates on the right of the apparatus run in regular numerical order from "0" to "9" and display "cents" registered. The next series of plates display the "dimes" registered; the next the "dollars," and so on. The lower ends of the curved arms 82, rest upon the horizontally movable bars 83, which work in guides 84, secured to cross-bar 4, Figs. 5, 13 and 14. The rear ends of bars 83 are connected with arms 84ª pivoted to plates 85 having a pin or stud 87, which engage with the upper ends of levers 88, pivoted to plates 85, and having their lower ends pivotally connected with studs 89 carried by arms 90 adjustably connected with the short arms of the registering levers 47, 47ª, 47ᵇ and 47ᶜ. Located underneath each series of display plates is a pivoted bail 91 connected with an arm 92, carried by a bail 93 pivoted in the uprights 3. A two armed lever 94 see Fig. 5, is pivoted to each registering key one end of which is adapted to engage with said bail and elevate it when the key is depressed. The other arm of the lever abuts against the lower shaft 22 which carries the indicating keys. Pivoted to one of the side arms of bail 93, is a downwardly depending arm 95, the lower end of which is connected with a lever 96 pivoted to one of the uprights of the apparatus. See Figs. 6. and 12. This lever engages with the lug 21 secured to the till cover and locks the same when closed. When, however, the registering key or keys are depressed to register sales or other transactions, the till cover is released by the bail, arm and lever.

The operation is as follows: When in normal position, at the beginning of a day's work, the display plates are all elevated, the pins 67, all pointing to zero on the segment plates 66, and the till cover closed. Supposing now that a cash sale amounting to five cents is made. The operator depresses the five cent key, causing the rear end thereof to be elevated, and the extension 24, of said key engaging with the rod 27, elevates the same and raises the rear ends of the pivoted arms 32 until the pins 37 thereon engage with the notches in the arms 34ª and 34ᵇ, thus holding said rod in its elevated position. As said rod 27 rises it carries with it the rod 29 pivotally connected therewith, and by means of the peculiar shape of the slots 30, in which said rod 29 works, the plate 29ª will be thrown under the elevated end of said key and the latter thus held in an elevated position. At the same time, the rear end of the key will strike the plate 39 disengaging the nut 41 from the bail 42, allowing the latter and its lever 47 to be depressed by the spring 52ª when a registering key is depressed, as hereinafter described. The appropriate registering key is now depressed, which elevates the bail 93 at the top of the apparatus to operate the display plates, which in turn elevates the arm 95 and throws the pivoted lever 96 out of engagement with lug 21, so that the till cover will be opened by means of its spring. As the till cover opens the arm 7 will engage with the lower arms 54ª of the levers 54, causing the transverse rod 53 to be operated until its movement is checked by the bail 42, striking the bent arm of the indicating lever key lever depressed. As before stated these bent arms being arranged at varying heights on the series of key levers, allow said rod 53 to fall a distance corresponding with the key depressed. As this rod falls it carries with it all the levers 47 which are connected with each other, and the rack bars connected therewith a corresponding distance. As said registering key is depressed, the eccentric rod 68 corresponding with said key is operated by means of the stud 76 and hooked lever 72 so as to allow the rack bar of the registering mechanism with which it corresponds, to fall into engagement with the ratchet wheel, so that when the rack bar corresponding with the indicating key depressed is elevated by the movement of the till cover, the ratchet wheel with which said rack bar engages will be correspondingly moved. As the registering key is depressed, as aforesaid, and the levers 47 operated, the bars 83 will be moved rearwardly a distance corresponding with the movement of said levers by means of the arms 84, stud 87, lever 88, stud 89, and arm 90, connected with said lever. The arm 84 will thus be withdrawn from beneath the first five display plates allowing them to fall to one side and the figure "5" displayed showing that a sale amounting to five cents has been registered. The till cover is now returned to normal position, and the roller 55 of the extension 56 of arms 7 will contact with the arms 54ª of levers 54, actuating the same, and the rod 53, which latter bearing against the short arms of levers 47, returns the same to normal position, which elevates the rack bars and causes the ratchet-wheel of the corresponding mechanism to be moved five teeth. As the till cover closes, the stud 19 thereon will strike the pivoted lug 20, disengaging the pin on the arm 32, from the notch in the levers 34ª and 34ᵇ and allowing the said side arms and their rod to fall and resume normal position. At the same time the bar or bail 73 will be depressed and engaging with the hooked end of lever 72 will depress the same and cause the eccentric rod to be actuated to throw the rack bars out of engagement with the ratchets. When the registering keys are depressed, the cam block 65ª will be oscillated, the step cams of which will successively strike the ends of arms 64ᶜ and elevating the pawls 64ᵈ, but as the latter are thrown out of the path of the ratchet wheels by the springs 64ʰ, they will not engage therewith. When, however, one of the ratchet wheels has been moved the extent of ten teeth, the pin 67 thereof will strike the arms 64ⁱ of the levers 64ᵍ, actuating the same and through the medium of the pins 64ᵉ will throw the pawls of the next ratchet wheel of higher value into engagement with said wheel so that upon the depression of the registering key, said wheel will be moved the extent of one tooth, thus indicating that the wheel of lesser value adjoining the same has been moved ten teeth. After this is accomplished, the springs 64ʰ return the lever and pawl to normal position.

In the above description, the operation refers to a cash sale made and registered, but it is obvious that a credit sale or amounts taken from the cash drawer, can be registered by depressing the appropriate registering key as the said registering mechanisms are exact duplicates of each other. It is also obvious that an indicating key in each series may be depressed and the amounts registered.

Having thus described my invention, what I claim is—

1. In a cash register the combination with the indicating keys, having rearward extensions, and upwardly projecting arms, gradually varying in height, of the transverse rod with which said extensions engage, the rod pivoted thereto, the slotted plate with which said rod engages, the side arms, one of which is provided with a stud, the spring actuated lever having a notch and the sliding till cover, having a lug, substantially as described.

2. In a cash register, the combination with the indicating keys, having upwardly extending arms gradually varying in height, and rearward extensions, of the transverse rod with which said extensions engage, the rod pivoted thereto, the slotted plate with which said rod engages, the side arms, one of which is provided with a stud, the spring actuated lever having a notch, with which said stud engages, the transverse pivoted plate having upwardly extending rods or arms provided with adjustable nuts, and the spring actuated bails with which said nuts engage; substantially as described.

3. In a cash register the combination with the indicating keys arranged in series and provided with upwardly extending arms, of the transverse shaft, the plates journaled thereon having upwardly extending rods provided with adjustable nuts, of the transverse rods provided with a series of levers journaled thereon, the bails connected with said levers and adapted to engage with said nuts, and means for releasing said levers, substantially as described.

4. In a cash register the combination with the series of indicating keys, having upwardly extending arms, at varying heights, the transverse rod having a series of plates journaled thereon, the upwardly projecting rods secured to said plates and provided with adjustable nuts, of the transverse shaft having a series of two armed levers journaled thereon, the bails secured to said levers, the bars connecting said levers together, the two-armed levers, the transverse bar connected with said levers, and the sliding till cover having an arm near each side provided with a roller with which the long arms of said levers engage, substantially as described.

5. In a cash register the combination with the series of indicating keys having upwardly extending arms at varying heights and rearward extensions, the transverse rod with which said extensions engage, the rod pivoted thereto and working in slotted plates, of the transverse rod having a series of pivoted plates provided with upwardly extending rods with adjustable nuts, the transverse rod provided with a series of two-armed levers, the bars connecting said levers, the spring-actuated bails secured to said levers, the vertical two-armed lever, the rods secured to the short arms thereof, and the sliding till cover having an extension or arm engaging with said lever, substantially as described.

6. In a cash register the combination with the series of indicating keys, having upwardly extending arms gradually varying in height, the transverse rod having a series of plates journaled thereon, provided with upwardly extending arms and adjustable nuts, the transverse rod carrying a series of pivoted two-armed connected levers, the series of spring actuated bails connected with said levers, and the transverse rod adapted to engage with the short arms of said levers, and means for actuating said rod, of the registering mechanisms, the registering keys, and the pivoted rack bars connected with said levers and adapted to engage with and actuate the registering mechanisms, substantially as described.

7. In a cash register the combination with the indicating keys, the two-armed levers, and means substantially as described for releasing said levers by depressing said keys, of the registering mechanisms, the rack bars connected therewith, and with the said levers, the registering keys, the pivoted bail with which said registering keys engage, the downwardly depending arm, the pivoted lever connected therewith, and the sliding till cover having a lug engaging with said lever, substantially as described.

8. In a cash register the combination with the frame, the cross-bar connecting the same, having a series of forwardly projecting rods, the series of two armed display plates pivoted on said rods, and the sliding bar adapted to support said display plates, of the series of indicating keys, and connections, the two-armed pivoted levers and means for actuating the same, the rack bars and registering mechanisms, the spring actuated pivoted arms connected with said sliding bars provided with studs, the pivoted levers connected with said two armed levers, the transverse bail, the horizontal bail pivoted on said forwardly projecting rods, the arms connecting said horizontal and transverse bails, and the registering keys adapted to engage with said transverse bail, substantially as described.

9. In a cash register the combination with the series of indicating keys, having upwardly extending arms at varying heights, and rearward extensions, the transverse rod provided with a series of pivoted plates having upwardly extending rods and adjustable nuts, the transverse rod with which said extensions engage, the rod pivoted thereto and journaled in slotted plates, the side pivoted arms, one of which is provided with a stud, the pivoted lever having a notch with which said stud engages, the transverse rod carrying a series of connected levers, the bails secured to said levers, the vertical levers having a transverse rod with which the short arms of said levers engage, the sliding till cover and pivoted lug, and the rack bars connected with said two-armed levers, of the registering mechanisms, the registering keys, the transverse bail with which said registering keys engage, the downwardly depending rod connected with a pivoted lever, and the lug on the sliding till cover with which said lever engages, substantially as described.

10. A key lever for cash registers consisting of two sheet metal plates having apertures near their centers and joined together at their front ends and separated at their rear ends, said front ends being provided with indicating plates and the rear ends with extensions; substantially as described.

11. A key lever for cash registers comprising two sheet metal plates riveted or otherwise connected together, and having an indicating plate at the front ends and a finger plate in rear thereof, substantially as described.

12. A key lever for cash registers consisting of two sheet metal plates connected together and having an indicating plate at the front end, a finger plate in rear thereof, rearwardly projecting extensions at the opposite end, and upwardly projecting arms, substantially as described.

In testimony that I claim the foregoing as my own I have hereunto affixed my signature in presence of two witnesses.

OLE TVERDAL.

Witnesses:
L. K. LUSE,
A. T. TORGERSON.